United States Patent [19]

Parthuisot et al.

[11] 4,431,094
[45] Feb. 14, 1984

[54] HYDRODYNAMIC TORQUE CONVERTER WITH BRIDGING MEANS

[75] Inventors: Jean P. Parthuisot, Rueil Malmaison; Claude Chevalier, Jouare Pontchartrain; Jean M. Bouvet, Boulogne-Billancourt, all of France

[73] Assignee: Regie Nationale des Usines Renault, Boulogne-Billancourt, France

[21] Appl. No.: 242,340

[22] Filed: Mar. 10, 1981

[30] Foreign Application Priority Data

Mar. 10, 1980 [FR] France ................. 80 06166

[51] Int. Cl.³ .............. F16D 47/06; B60K 41/22
[52] U.S. Cl. .................... 192/3.3; 192/3.31; 192/3.58
[58] Field of Search .......... 192/3.3, 3.29, 3.31, 192/3.58

[56] References Cited

U.S. PATENT DOCUMENTS

| | | | |
|---|---|---|---|
| 3,073,183 | 1/1963 | Kelley | 192/3.3 X |
| 3,126,988 | 3/1964 | Memmer | 192/3.3 X |
| 3,185,273 | 5/1965 | Smirl | 192/3.3 |
| 3,977,502 | 8/1976 | Chana | 192/3.31 X |
| 4,033,202 | 7/1977 | Ahlen et al. | 192/3.31 X |
| 4,049,093 | 9/1977 | Vukovich et al. | 192/3.3 |
| 4,071,125 | 1/1978 | Jameson | 192/3.3 |
| 4,181,203 | 1/1980 | Malloy | 192/3.31 X |
| 4,270,636 | 6/1981 | Sunohara et al. | 192/3.31 |
| 4,386,687 | 6/1983 | Chevalier et al. | 192/3.31 X |

FOREIGN PATENT DOCUMENTS

| | | | |
|---|---|---|---|
| 1246261 | 10/1960 | France. | |
| 2323066 | 4/1977 | France. | |
| 971639 | 9/1964 | United Kingdom | 192/3.29 |
| 2017874 | 10/1979 | United Kingdom | 192/3.3 |

*Primary Examiner*—Rodney H. Bonck
*Attorney, Agent, or Firm*—Owen, Wickersham & Erickson

[57] ABSTRACT

This hydrodynamic torque converter for the automatic transmission of motor vehicles which provide several gear ratios comprises means for bridging the input and output shafts of the converter. The hydraulic fluid supplied through the hollow transmission shaft penetrates into the converter inner space via a gaged orifice; the outlet of the control chamber of the converter is closed by a solenoid valve in one position thereof; the pressure in the converter inner space is the same as in the control chamber, and spring means are provided for urging the control piston to its release position when the assembly operates as a torque converter. In the other valve position the pressure prevailing in the converter inner space having its outlet closed is applied to the control piston against the force of the spring means. The pressure in the control chamber is low and thus the friction lining carried by the control piston produces the desired bridging action.

11 Claims, 2 Drawing Figures

HYDRODYNAMIC TORQUE CONVERTER WITH BRIDGING MEANS

BACKGROUND OF THE INVENTION

The present invention relates to a hydrodynamic torque converter comprising bridging means permitting the slip-free coupling of the input and output shafts of the converter.

A hydrodynamic torque converter of this general type may advantageously be used in an automatic transmission for motor vehicle which provides several gear or drive ratios, the change from one ratio to another occuring during the torque transmission. In a transmission of this character, the hydrokinetic torque converter is disposed between the power unit and the change-speed mechanism. The function of the torque converter is to multiply the input torque delivered by the vehicle engine by a certain coefficient during a transient phase also referred to as the torque conversion phase. Beyond a predetermined value of the rotational speed of the output shaft of this converter, the torque conversion phase comes to an end and a coupling phase begins during which, however, a certain degree of slip takes place between the input and output members of the converter, and reduces the total efficiency of the power unit and transmission assembly while increasing the fuel consumption. In order to reduce the engine fuel consumption in a vehicle having an automatic transmission with torque converter, various means have already been proposed for rigidly coupling the input and output members right at the end of the conversion phase in order to eliminate any detrimental slip. This constitutes the so-called "bridging" between the output shaft and the input shaft of the torque converter.

Among the known devices developed for controlling the bridging of torque converters, a few comprise external hydraulic-fluid supply means separate from the circuit for feeding or overfeeding the converter inner space. This leads to a considerable intricacy of the bridge control system and also to the impossibility of constructing a compact device.

SUMMARY OF THE INVENTION

Consequently, the present invention is directed to a torque converter comprising bridge control system so devised that the overall dimensions of the assembly can be minimized while providing through simple means the various desired control functions.

It is another object of the present invention to provide a torque converter of the character broadly set forth hereinabove wherein the means supplying hydraulic fluid to the converter are designed for delivering this fluid constantly in the same direction and under a constant pressure, the bridging action being produced by means of an intermediate, lower pressure in a particularly simple manner inside the converter itself.

On the other hand, and in contrast to the various hitherto known bridge control devices, this invention provides a torque converter wherein the bridge control action can take place by using data relating to the operation of the transmission and also of the vehicle equipped therewith, these data being processed in electronic means; the bridging effect can thus take place for each gear ratio and is prevented from occurring during gear changes, with due consideration for the actual converter operation.

The hydrodynamic torque converter according to this invention comprises on the one hand bridging means capable of producing a slipless coupling between the input and output shafts of the converter, and on the other hand a clutch provided with a control piston. This clutch control piston is responsive to the pressure prevailing in the converter inner space or casing and has a gauged passage formed therein for throttling the fluid and permitting the communication between the converter inner space and a control chamber of which the control piston constitutes a movable wall. A control valve, advantageously of the solenoid-operated type, is inserted in the hydraulic fluid supply circuit of the converter between the converter inner space and the fluid return conduit, i.e. downstream of the converter proper. This valve is adapted to cause the pressure exerted on one face of the control piston to vary while the other face of the piston remains responsive to the constant pressure of the supply fluid.

As already mentioned hereinabove, the hydraulic fluid is supplied to the converter constantly in the same direction and under a constant pressure, the control valve determining an intermediate pressure permitting the actuation of the bridging means.

In a first form of embodiment of the invention, the constant-pressure hydraulic fluid is supplied directly to the converter inner space. The control valve is a three-way, two-position valve so connected as to close the converter casing circuit in a first position and the control chamber circuit in a second position. A restrictive passage is provided in the hydraulic circuit between the converter inner space and the control valve so that in the aforesaid second position of the control valve the pressure in the converter inner space be substantially equal to the pressure existing in the control chamber and to the pressure of the hydraulic fluid supplied to the converter. A return spring is provided in the control chamber for urging the control piston towards the converter inner space.

With this arrangement, when the control valve is in its second position and closes the control chamber, the two faces of the control piston are exposed to substantially identical hydraulic pressures and it is the force or the return spring associated with the control piston that causes the translation of this piston in the direction to discontinue the bridging action, so that the assembly can operate as a torque converter.

In a second form of embodiment of the invention, the constant-pressure hydraulic fluid is directed to the control chamber. The control valve consists of a simple check valve, preferably of the electrically-operated type. Another restrictive passage is provided in a secondary return conduit leading to the fluid reservoir. With this arrangement, the first restrictive passage consisting of a gauged orifice formed through the wall of the disc-like control piston and of this secondary return conduit, in combination with the check valve, provides an intermediate fluid pressure in the converter casing. The value of this intermediate pressure is determined by the open or closed position of the check valve. In this specific form of embodiment the return spring mounted inside the converter urges the control piston towards the control chamber.

In all cases, the control piston is disposed inside the bell-shaped member forming the converter casing and comprises a braking portion cooperating with the clutch. Preferably, a torsional vibration damping device is disposed between the clutch and the output shaft.

Besides, the constant-pressure hydraulic fluid is supplied through a hollow central transmission shaft and via a distribution chamber located at the end of the converter hub. Thus, a particularly, compact structure is obtained while reducing considerably losses under load, notably in—a transmission comprising a change-gear mechanism incorporated in the final drive.

Preferably, the control valve for switching the converter either to its bridging position or to its torque converting position is actuated by electronic means receiving signals corresponding to the input shaft rotational speed and to the converter output shaft rotational speed, respectively. The control valve is switched from one position to another when the ratio of these speeds reaches a predetermined value corresponding to the theoretical coupling point of the converter. Preferably, the electronic means comprise a timing circuit to which signals corresponding to the change of transmission ratio are fed, so that the bridging action can be discontinued during each gear change through a corresponding actuation of the control valve governing the position of the control piston.

The invention will now be described more in detail with reference to the accompanying drawings illustrating diagrammatically by way of example two typical forms of embodiment thereof, given by way of illustration, not of limitation.

THE DRAWINGS

FIG. 1 is a diagrammatic longitudinal section showing a hydrodynamic torque converter according to the present invention, and FIG. 2 is a similar view of a modified form of embodiment of the hydrodynamic torque converter according to this invention.

DESCRIPTION OF THE PREFERRED EMBODIMENTS

Figure 1:
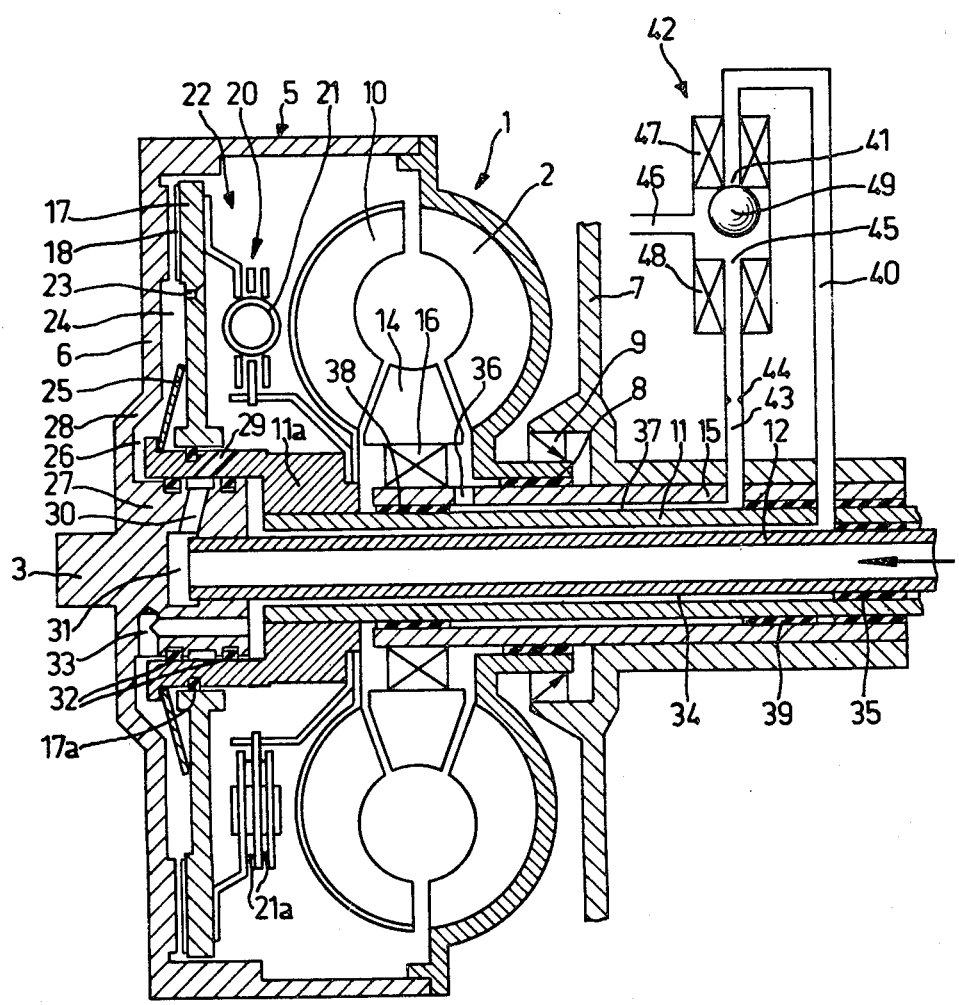

Referring first to FIG. 1, the torque converter 1 comprises an input member or blading 2 constituting the pump impeller, which is rigidly and mechanically connected to the input or drive shaft 3 coupled to the driving engine or power unit (not shown) via a cylindrical or bell-shaped casing or cover 5 having a substantially flat outer wall 6. The impeller 2 revolves in relation to the converter mounting or supporting frame 7 with the interposition of a ring seal 8 and a shaft seal 9.

The output member or turbine 10 of converter 1 is connected through a sleeve-like hub 11a to an output shaft 11 adapted to rotate in relation to a central hollow transmission shaft 12. The converter 1 is completed by a reactor or stator 14 interposed between the impeller 2 and the turbine 10, and mounted on a fixed shaft 15 with the interposition of a freewheel device 16 so that in one direction of rotation the reactor 14 is rigidly coupled to the shaft 15 fastened to the converter frame 7.

A control piston 17 consisting essentially of a flat disc is adapted to slide axially in relation to the sleeve or hub 11a with the interposition of a shaft seal 17a fitted in an annular groove formed in sleeve 11a. This piston 17 has its outer annular marginal portion covered with a friction lining 18 adapted to cooperate with the registering internal surface 6 of cover 5 for rotatably coupling this cover 5 with control piston 17, somewhat in the fashion of a friction clutch. The axial movement of piston 17 on hub 11a towards the turbine 10 is limited by a stop ring or the like (not shown) rigid with hub 11a, in order to limit the movement of faces 6 and 18 away from each other. Besides, control piston 17 is rigidly coupled to turbine 10 by a damping device 20 comprising a plurality of helical compression springs 21 and friction facings or washers 21a in order to provide a smooth engagement and damp out torsional vibration.

It will be seen that the control piston 17 and damping device 20 are enclosed inside the converter casing or cover 5 so as to constantly operate in the hydraulic fluid medium. The engagement and disengagement or release of the clutch consisting of lining 18 and control piston 17 are thus obtained by pressing the piston against the parallel internal face 6 of the converter casing 5 forming an integral part of the input impeller 10.

In addition, the control piston 17 comprises in or through its disc portion at least one gauged orifice 23 constituting a restricted passage through which the converter inner space 22 communicates with a control chamber 24 of which control piston 17 constitutes a main movable wall. A spring 25 consisting, in the example illustrated, of a spring washer, constantly urges the piston 17 forming the control chamber 24 away from this chamber and consequently towards the space 22. This spring washer 25 reacts against a shoulder 26 formed at the outer end of sleeve 11a. On the other hand, it is clear that the flat wall 6 of bell 5 comprises in the vicinity of hub 27 an off-set portion 28 of substantially frusto-conical configuration in order to expand somewhat the control chamber 24 in this area for accomodating the resilient washer 25.

The inner space 22 of converter 1 is connected to the hydraulic fluid supply received in the hollow central transmission shaft 12 through a port or passage hole 29 formed through the sleeve 11a rigid with the turbine 10 and also through another port or passage hole 30 formed in the hub 27 rigid with the impeller 2. This port or passage hole 30 communicates in turn with a distribution chamber 31 formed at the end of hub 27 and connected to the hollow shaft 12. The port or passage hole 30 is fluid tight due to the provision of a pair of annular seals 32 fitted in corresponding grooves formed in said hub 27 and disposed on either side of port 30.

Another passage 33 also formed in hub 27 interconnects the control chamber 24 formed between the control piston 17 and the end face 6 of casing 5, as illustrated, and the annular gap 34 left between the transmission shaft 12 and the output shaft 11. This gap is limited by a ring seal 35.

On the other hand, the hydraulic fluid from chamber 22 is expelled via another orifice or port 36 formed in the fixed shaft 15 which causes the space 22 to communicate with the annular gap 37 left between the fixed shaft 15 and the output shaft 11. The annular gap 37 is properly sealed by means of ring seals 38 and 39.

The annular gap 34 communicating with control chamber 24 is also connected to a conduit 40 leading to one port 41 of a three-way, two-position solenoid-operated valve 42. The annular gap 37 communicating with chamber 22 is connected via another conduit 43 incorporating a restrictive passage 44 to a second port 45 of valve 42. The outlet orifice of solenoid valve 42 is connected in turn through a conduit 46 to the hydraulic fluid reservoir (not shown) which is at zero pressure. In the form of embodiment illustrated in FIG. 1, the solenoid valve 42 comprises two opposite electromagnets 47, 48 adapted when energized to attract by turns a ball valve 49 to one of its two positions for closing the corresponding port 41 or 45.

OPERATION OF FIRST EMBODIMENT

In actual service the converter and its bridging control system operate as follows. When the solenoid 47 of valve 42 is energized, the ball valve 49 is seated to close port 41, as shown in FIG. 1, so that the hydraulic circuit of control chamber 24 is closed. The hydraulic fluid from space 22 is returned to the fluid reservoir via the outlet orifice 36, conduit 43 and port 45 from which the ball valve 49 was unseated. The restricted passage 44 limits the fluid output from space 22. The pressure thus obtained in this space 22, considering the provision of the throttling action exerted by the device 44, is the same as the pressure prevailing at the same time in control chamber 24. This chamber 24 communicates with space 22 via the gap existing between the friction lining 18 and the front wall 6, and also through the gauged orifice 23 formed through the thickness of control piston 17. The action exerted by spring washer 25 is preponderant and holds the control piston 17 away from said front wall 6 of the cover 5 of impeller 2. Under these conditions, the converter operates as a torque conversion device.

When in contrast thereto the other solenoid 48 of valve 42 is energized, the ball valve 49 will close port 45 in the position opposite the one illustrated in FIG. 1, so that the converter circuit is closed while control chamber 24 can communicate with the hydraulic fluid reservoir via conduit 40 and port 41 now left open by ball valve 49. The pressure of the supply fluid which prevails in space 22 is sufficient to overcome the force of return spring 25, with due consideration for the presence of the gauged orifice 23 constituting a throttling or restrictive passage limiting the fluid output towards chamber 24. Thus, control piston 17 is moved until the friction lining 18 contacts the corresponding inner area of wall 6. In this position, the engine torque from impeller 2 is transmitted directly to turbine 10 via the damping device 24, and the converter is in its bridging condition. It should be noted that the kinetic pressure due to the centrifugal force acting on the fluid contained in the converter adds itself to the kinetic pressure prevailing in the converter inner space to increase the mutual engagement between the friction lining 18 and the registering wall portion 6 of casing 5, while ensuring an adequate fluid-tightness of control chamber 24. Under these conditions, the hydraulic fluid is returned to the fluid reservoir from space 22 via gauged orifice 23 and control chamber 24. Another function of this gauged orifice 23 is to permit the release of control piston 17 urged by spring washer 25 when restoring the torque conversion by eliminating the bridge effect, this elimination being obtained by balancing the pressures on both sides of control piston 17.

Figure 2:
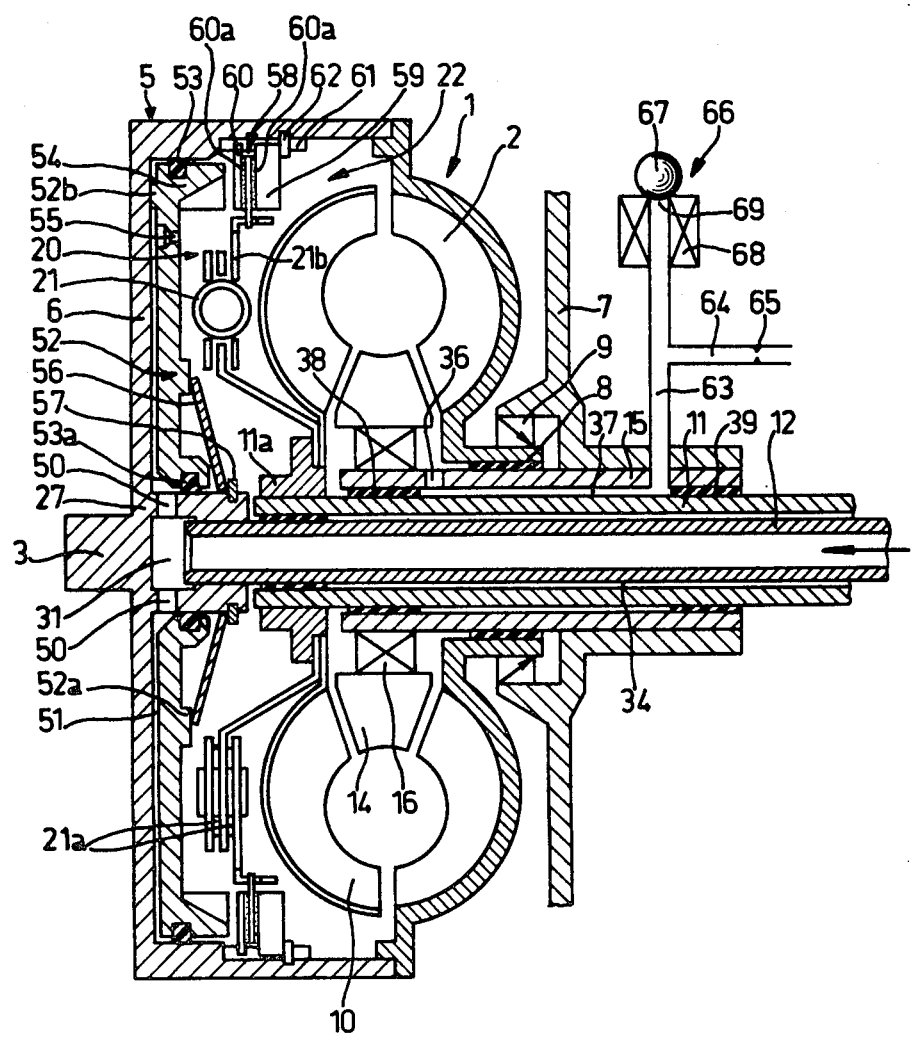

Referring now to the modified form of embodiment illustrated in FIG. 2 of the drawings, the same or corresponding component elements are designated by the same reference numerals as in FIG. 1, the only difference between the two forms of embodiment being the mode of circulation of the hydraulic fluid, the arrangement of the control piston return spring and the structure of the control solenoid-operated valve.

As clearly shown in FIG. 2, in this modified form of embodiment the distribution chamber 31 communicates directly through passages or ports 50 with the control chamber 51 of which the control piston 52 constitutes one of the main walls, in fact its movable wall. The control piston 52 has substantially the shape of a flat annular flange and comprises piston seals 53, 53a fitted in annular grooves formed in the central bore of control piston 52 and in its thickened peripheral outer portion 54. During the movements of control piston 52 these seals cooperate with the external surface of the hub 27 of impeller 2 and with the inner cylindrical surface of cover 5.

At least one gauged orifice 55 constituting a restrictive passage is formed through the thickness of control piston 52 and causes the control chamber 51 to communicate with the inner space 22 of converter 1. A spring consisting in this example of a spring washer 56 is provided in this space 22 around the hub 27 and reacts against a circlip 57 engaged in a matching groove formed in hub 27. The spring 56 engages a protruding annular rib 52a of control piston 52. Besides, this piston 52 has formed on its face forming one major wall of control chamber 51 a number of projections 52b acting as stop elements by engaging the front wall 6 when the control piston 52 is pressed thereagainst, so that the volume of control chamber 51 cannot be reduced to zero.

The peripheral wall 54 of control piston 52 cooperates with a clutch 58 comprising a pressure plate 59 and a plurality of plain clutch discs 60 and one or a plurality of clutch discs 60a lined with friction material. The plain discs 60 are provided with peripheral teeth adapted to cooperate with corresponding, fluid-tight notches 61 formed in the inner diameter of cover 5. The lined discs 60a cooperate on the other hand with notches formed in the plate 21b of damping device 20. The permissible axial movement of pressure plate 60 is limited by a stop ring 62. One of the aforesaid discs 60 is rigid with the damping device 20 similar to that of the first form of embodiment shown in FIG. 1.

The annular gap 37 communicating via outlet orifice 36 with the inner space 22 of converter 1 is connected to a conduit 63 having a branch outlet line 64 provided with a restrictive passage 65 and leading to the hydraulic fluid reservoir (not shown). The conduit 63 is also connected to a solenoid-operated valve 66 which, in the form of embodiment illustrated, consists of a simple ball valve 67 and an electromagnet 68. The ball valve 67 is adapted to close the outlet port 69 connected to the fluid reservoir. Thus, when the outlet 69 is closed by ball valve 67 the hydraulic fluid output from the converter is checked.

OPERATION OF SECOND EMBODIMENT

In actual service this form of embodiment of the torque converter and its bridging control system, as shown in FIG. 2, operate as follows. The converter 1 is supplied with hydraulic fluid under constant pressure via the hollow shaft 12 and the distribution chamber 31. When the ball valve 67 responsive to solenoid valve 66 controlling the bridging action is in the position shown in FIG. 2, it closes the outlet port 69 of conduit 63 and the hydraulic fluid can return to the reservoir only through the outlet line 64 and its restricted passage 65, thus limiting the output from the converter. A pressure $P_1$ lower than the supply pressure P is thus obtained in the converter inner space 22 inserted in the hydraulic circuit formed between the gaged input orifice 55 and the outlet restrictive passage 65. The pressure $P_1$ thus applied to the surface of control piston 52 which faces the inner space 22, in combination with the force of spring 56 which has the same direction, produce a force $F_1$ greater than the force F resulting from the fluid supply pressure P exerted against the piston face adjacent the fluid-receiving chamber 51. Thus, control piston 52 is caused to bear against the inner front face of wall 6, as shown in the Figure. Clutch 58 is released and the complete assembly operates like an ordinary torque converter.

When the solenoid valve 66 is energized to unseat the ball valve 67 from outlet port 69, the fluid output from the converter increases. The pressure prevailing in space 22 drops and assumes a value $P_2$ lower than the above-defined or preceding pressure $P_1$. Therefore, the supply pressure P applied to the piston face adjacent its control chamber 51 becomes sufficient—notwithstanding the lower pressure $P_2$ exerted on the opposite face of piston 52 and the force of spring 56—to produce an inward movement of control piston 52, i.e. towards clutch 58, so as to engage the latter. The torque is then transmitted directly from impeller 2 to turbine 10 via the damping device 20, and thus the converter is in its bridged condition and any slip between the turbine and the impeller is safely eliminated.

Now if desired the solenoid-operated valve 66 may be so designed as to open the valve when an electric signal is fed thereto, in order to obtain the above-described mode of operation. It is also possible to provide a control solenoid valve operating in the reverse mode. In this case, the control valve is closed when no electric signal is fed thereto, the outlet port 69 being closed by ball valve 67. This modified structure is advantageous in that the assembly can operate as a torque converter in case of failure of the solenoid valve or of the electric control circuit.

In all cases, an efficient bridging control action is obtained which is further characterized by the fact that the converter construction can be particularly compact.

Preferably, this invention is applicable to an automatic transmission for automobile vehicles, of the type providing a plurality of gear ratios and wherein the gear changes take place while the engine torque is being transmitted therethrough. In this case, the torque converter is associated with an electronic control system receiving signals corresponding to the rotational speed of the input shaft 3 and of the output shaft 11, in order to control the bridging means by delivering suitable electric signals to the bridging control valve 42 or 66 when the ratio of these speeds attains a predetermined threshold value. Also preferably, a timing circuit further receiving signals corresponding to the gear is provided, so that the bridging action is discontinued at each gear change by delivering a suitable electric signal to the control solenoid valve during the time necessary for performing the gear change. This apparatus is described and claimed in U.S. Pat. No. 4,386,687.

We claim:
1. A transmission device having input and output shaft means, a housing drivingly connected to said input shaft means and defining an enclosure, hydrodynamic torque converter means disposed within said housing enclosure and having an impeller member drivingly connected to said housing and a turbine member coupled to said output shaft means, and bridging means capable of coupling without substantial slip said impeller and turbine members, said bridging means comprising
a clutch assembly having a control chamber and control piston means for coupling and uncoupling said turbine and impeller members, said piston constituting a movable wall common to both said control chamber and said housing enclosure and having a first restrictive orifice therethrough to enable restricted fluid communication between said housing enclosure and said control chamber, said control chamber having spring means for urging said control piston towards a position where said impeller and turbine members are uncoupled, a hydraulic circuit having a substantially constant-pressure unidirectional fluid source connected to said clutch assembly, return means for returning said fluid from said clutch assembly to a fluid reservoir, by one at least of two pathways one only of which includes a second restrictive orifice exterior to said clutch assembly, control valve means actuated independently of said hydraulic circuit for determining whether the pathway of said return means comprises only the pathway having the second restrictive orifice or includes the other said pathway as at least the principal fluid conveying conduit, said second restrictive orifice, when part of the sole pathway, providing means for moving said control piston toward a position in which said impeller and turbine members are uncoupled, whereas when the unrestricted return pathway is used, it provides means for moving said control piston toward a position in which said impeller and turbine members are coupled.

2. The device of claim 1, wherein a torsional vibration damper is disposed between said clutch assembly and said output shaft.

3. The device of claim 1, having a converter hub keyed to said output shaft, comprising a hollow central shaft through which the constant-pressure hydraulic fluid is fed to said clutch assembly via a distribution chamber disposed at the end of the converter hub.

4. The device of claim 1, for an automatic transmission of a motor vehicle which provides several gear ratios, the change from one ratio to another occurring during the torque transmission, wherein the torque converter is associated with electronic control means receiving signals corresponding to the rotational speeds of both the input and output shafts of the converter, so as to act on said control valve means and thereby bridge said shafts when the gear ratio reaches a predetermined value, an electronic timing circuit further receiving signals corresponding to the gear change and to act on said control valve means in order to discontinue the bridging action during the time interval necessary for accomplishing each gear change.

5. A transmission device having input and output shaft means, a housing drivingly connected to said input shaft means and defining an enclosure, hydrodynamic torque converter means disposed within said housing enclosure and having an impeller member drivingly connected to said housing and a turbine member coupled to said output shaft means, and bridging means capable of coupling without substantial slip said impeller and turbine members, said bridging means comprising
a clutch assembly having a control chamber and a control piston constituting a movable wall common to both said control chamber and said housing enclosure and having a first restrictive passage therethrough to enable restricted fluid communication between said housing enclosure and said control chamber, said control chamber having spring means for urging said control piston towards said housing enclosure to a position where said impeller and turbine members are uncoupled, hydraulic circuit means connecting said housing enclosure to a substantially constant-pressure unidirectional fluid source, said hydraulic circuit comprising electrically actuated control valve means positioned between said housing enclosure and said control chamber on the one hand and a return line to a fluid reservoir on the other hand, said hydraulic circuit further comprising a second restricted passage between said housing enclosure and said control valve, whereby the return of the fluid from said housing enclosure can be made
- (a) in one position of said control valve means, directly from said housing enclosure to said reservoir through said second restricted passage of the hydraulic circuit and said control valve means, so that said control piston is moved toward a position in which said impeller and turbine members are uncoupled or
- (b) indirectly through said first restricted passage in the control piston, and thence to the reservoir via the control chamber and said control valve means, so that said control piston is moved toward a position in which said impeller and turbine members are coupled.

6. The device of claim 5, wherein said spring means is disposed in said control chamber and urges said control piston in a direction to enlarge said control chamber.

7. The device of claim 5 wherein said control piston has on its face that lies in said control chamber a friction clutch lining also acting as a fluid-tight seal for said control chamber when engaged with the opposite wall thereof.

8. A transmission device having input and output shaft means, a housing drivingly connected to said input shaft means and defining an enclosure, hydrodynamic torque converter means disposed within said housing enclosure and having an impeller member drivingly connected to said housing and a turbine member coupled to said output shaft member, and bridging means capable of coupling without substantial slip said impeller and turbine members, said bridging means comprising a clutch assembly having a control chamber and a control piston with a first restrictive passage therethrough to enable restricted fluid communication between said housing enclosure and said control chamber, of which said control piston constitutes a movable wall, spring means adapted to urge said control piston towards said control chamber to a position where said impeller and turbine members are uncoupled, hydraulic circuit means connecting said control chamber to a substantially constant pressure unidirectional fluid source, said hydraulic circuit comprising a first return line to a fluid reservoir having electrically actuated control valve means between said housing enclosure and said reservoir and a second return line to said reservoir having a second restricted passage between said housing enclosure and said reservoir, whereby the return of the fluid to said reservoir from said control chamber can be made
- (a) when said control valve means is closed, through said second restricted passage of the control piston, said housing enclosure and said restricted passage of the hydraulic circuit, so that said control piston is moved toward a position in which said impeller and turbine members are uncoupled, or
- (b) when said control valve means is open, through said first restricted passage of the control piston, said housing enclosure and said control valve means, so that said control piston is moved toward a position in which said impeller and turbine members are coupled.

9. The device of claim 8, wherein said spring means is disposed in said housing enclosure for constantly urging said control piston in a direction to diminish said control chamber.

10. A transmission device having input and output shaft means, a housing drivingly connected to said input shaft means and defining an enclosure, hydrodynamic torque converter means disposed within said housing enclosure and having an impeller member drivingly connected to said housing and a turbine member coupled to said output shaft means, and bridging means capable of coupling without substantial slip said impeller and turbine members, said bridging means comprising a clutch assembly having a control chamber and a control piston constituting a movable wall common to both said control chamber and said housing enclosure and having a first restrictive passage therethrough to enable restricted fluid communication between said housing enclosure and said control chamber, said control chamber having spring means for urging said control piston towards said housing enclosure to a position where said impeller and turbine members are uncoupled, hydraulic circuit means connecting said housing enclosure to a substantially constant-pressure unidirectional fluid source, said hydraulic circuit means comprising a control valve positioned between said housing enclosure and said control chamber on the one hand and a return line to a fluid reservoir on the other hand, said hydraulic circuit means further comprising a second restricted passage between said housing enclosure and said control valve, whereby the return of the fluid from said housing enclosure can be made
- (a) in one position of said control valve, directly from said housing enclosure to said reservoir through said second restricted passage and said control valve, so that said control piston is moved toward a position in which said impeller and turbine members are uncoupled or
- (b) indirectly through said first restricted passage and thence to the reservoir via the control chamber and said control valve, so that said control piston is moved toward a position in which said impeller and turbine members are coupled.

11. A transmission device having input and output shaft means, a housing drivingly connected to said input shaft means and defining an enclosure, hydrodynamic torque converter means disposed within said housing enclosure and having an impeller member drivingly connected to said housing and a turbine member, and bridging means capable of coupling without substantial slip said impeller and turbine members, said bridging means comprising a clutch assembly having a control chamber and a control piston with a first restrictive passage therethrough to enable restricted fluid communication between said housing enclosure and said control chamber, of which said control piston constitutes a movable wall, spring means adapted to urge said control piston towards said control chamber to a position where said impeller and turbine members are uncoupled, hydraulic circuit means connecting said control chamber to a substantially constant pressure unidirectional fluid source, said hydraulic circuit comprising a first return line to a fluid reservoir having a control valve between said housing enclosure and said reservoir and a second return line to said reservoir having a second restricted passage between said housing enclosure and said reservoir, whereby the return of the fluid to said reservoir from said control chamber can be made (a) when said control valve is closed, through said restricted passage of the control piston, said housing enclosure and said second restricted passage, so that said control piston is moved toward a position in which said impeller and turbine members are uncoupled, or (b) when said control valve is open, through said first restricted passage, said housing enclosure, and said control valve, so that said control piston is moved toward a position in which said impeller and turbine members are coupled.

* * * * *

UNITED STATES PATENT AND TRADEMARK OFFICE
CERTIFICATE OF CORRECTION

PATENT NO. : 4,431,094
DATED : February 14, 1984
INVENTOR(S) : Jean P. Parthuisot et al It is certified that error appears in the above-identified patent and that said Letters Patent are hereby corrected as shown below:

First page, left-hand column, item [30] Foreign Application Priority Data, "Mar. 10, 1980" should read --Mar. 19, 1980--.

Column 2, line 43, "force or" should read --force of--.

Signed and Sealed this

Twenty-fourth Day of April 1984

[SEAL]

Attest:

GERALD J. MOSSINGHOFF

Attesting Officer       Commissioner of Patents and Trademarks